US007692335B2

(12) United States Patent
Michalko

(10) Patent No.: US 7,692,335 B2
(45) Date of Patent: Apr. 6, 2010

(54) METHOD AND APPARATUS FOR MECHANICAL PHASE SYNCHRONIZATION OF MULTIPLE AC GENERATORS

(75) Inventor: Rodney G. Michalko, Ontario (CA)

(73) Assignee: Honeywell International Inc., Morristown, NJ (US)

( * ) Notice: Subject to any disclaimer, the term of this patent is extended or adjusted under 35 U.S.C. 154(b) by 344 days.

(21) Appl. No.: 11/270,507

(22) Filed: Nov. 10, 2005

(65) Prior Publication Data

US 2006/0108882 A1 May 25, 2006

Related U.S. Application Data

(60) Provisional application No. 60/629,423, filed on Nov. 22, 2004.

(51) Int. Cl.
*H02J 3/00* (2006.01)
(52) U.S. Cl. ..................................................... 307/84
(58) Field of Classification Search .................... 307/84
See application file for complete search history.

(56) References Cited

U.S. PATENT DOCUMENTS

| 2,935,686 | A | * | 5/1960 | Kerns et al. ................... 327/42 |
| 3,794,846 | A | | 2/1974 | Schlicher et al. |
| 4,074,946 | A | | 2/1978 | Swearingen |
| 4,575,671 | A | | 3/1986 | Lee et al. |
| 4,994,684 | A | | 2/1991 | Lauw et al. |
| 5,077,485 | A | | 12/1991 | Rashid |
| 5,153,498 | A | | 10/1992 | Parro |
| 5,325,043 | A | | 6/1994 | Parro |
| 5,587,647 | A | * | 12/1996 | Bansal et al. ................. 322/45 |
| 5,640,060 | A | | 6/1997 | Dickson |
| 5,646,458 | A | | 7/1997 | Bowyer et al. |
| 5,729,059 | A | | 3/1998 | Kilroy et al. |
| 5,813,488 | A | | 9/1998 | Weiss |
| 6,252,828 | B1 | | 6/2001 | Shinkawa et al. |
| 6,373,376 | B1 | | 4/2002 | Adams et al. |
| 6,392,371 | B1 | | 5/2002 | Cheng et al. |
| 2002/0084120 | A1 | * | 7/2002 | Beasley ..................... 180/65.3 |
| 2005/0051111 | A1 | * | 3/2005 | Thoma ......................... 122/26 |
| 2005/0096140 | A1 | * | 5/2005 | Schlegelmann et al. ...... 464/130 |
| 2005/0179264 | A1 | * | 8/2005 | Ganev ....................... 290/40 C |
| 2005/0280264 | A1 | * | 12/2005 | Nagy ............................ 290/55 |

* cited by examiner

*Primary Examiner*—Fritz M Fleming
*Assistant Examiner*—Dru M Parries
(74) *Attorney, Agent, or Firm*—Oral Caglar, Esq.

(57) ABSTRACT

An apparatus performs mechanical phase synchronization of multiple AC generators in an electrical power distribution system. The apparatus according to one embodiment comprises a gearbox mechanically coupled to a prime mover, multiple AC generators, each having a rotor driven by mechanical energy from the prime mover supplied via the gearbox to generate AC electrical power, and a mechanical linkage keying orientation of each rotor to the gearbox, thereby mechanically synchronizing phase of the multiple AC generators.

16 Claims, 12 Drawing Sheets

METHOD AND APPARATUS FOR MECHANICAL PHASE SYNCHRONIZATION OF MULTIPLE AC GENERATORS

CROSS REFERENCE TO RELATED APPLICATION

The present invention claims priority under 35 U.S.C. §119 (e) of U.S. Provisional Application No. 60/629,423 filed Nov. 22, 2004, the entire contents of which are herein incorporated by reference in their entirety.

BACKGROUND OF THE INVENTION

1. Field of the Invention

The present invention relates to electrical systems for vehicles, and more particularly to a method and apparatus for achieving mechanical phase synchronization of multiple AC generators in an electrical power distribution system.

2. Description of the Related Art

Large vehicles such as aircrafts and ships require large amounts of energy to drive all onboard equipment. Increasing size and weight of energy producing systems, such as generators and motors, puts a limit on feasible size and complexity of large vehicles. "More electric" vehicles, which use electrical energy generators while eliminating bulky and vulnerable hydraulic systems, are being designed and produced. To satisfy the demand of electrical energy for "more electric" vehicles, large electrical generators are required. AC Variable Frequency generators provide an attractive solution, as they keep weight and cost down while increasing reliability. However, single AC Variable Frequency generators can not typically meet the power requirements of a vehicle with high electrical power demand, because an AC Variable Frequency generator capable of providing the required large electrical output would easily exceed technological, spatial, design, construction and installation limitations for both the generator and its prime mover.

In order to stay within spatial and technological limitations of generators while providing the large required electrical energy output, multiple smaller AC Variable Frequency generators can be combined to meet the required electrical energy output. However, the outputs of AC Variable Frequency generators that are not synchronized in phase and voltage cannot be combined, as current and voltage would be transferred between AC Variable Frequency generators without reaching the electrical distribution system of a vehicle. If the mismatch in frequency and voltage between AC Variable Frequency generators is large, their combined output can become unstable, leading to a shutdown or damage to the vehicle's electric system.

As a result, the use of multiple AC generators that are not synchronized requires one isolated bus for each AC generator to perform the necessary distribution of electrical generated power. As the number of prime movers and AC generators per prime mover increases for a vehicle application, the complexity of the electrical distribution system and of the electrical control system becomes extensive.

A few publications have studied systems that combine AC generators. One such technique is described in "Voltage Regulator Load Division Using Real and Reactive Generator Output Power Components to Control the Exciter", Abdul Rashid, U.S. Pat. No. 5,077,485. With the method described in this work, a constant speed drive control and feedback system is used to combine generators to produce 400 Hz AC output. The constant speed drive control and feedback system adds significant complexity to the system. Moreover, this technique is not applicable to AC variable frequency generators installations.

Another technique is described in "Methods and Apparatus for Synchronizing Multiple Motor Driven Generators", Robert Lee and Suresh Gupta, U.S. Pat. No. 4,575,671. In this publication, however, electric motors located between a prime mover and generators are de-energized for manual synchronization of generators using a slipping pole technique.

A disclosed embodiment of the application synchronizes multiple AC generators by utilizing a method and an apparatus for mechanical phase synchronization of multiple AC generators.

SUMMARY OF THE INVENTION

The present invention is directed to an apparatus for achieving mechanical phase synchronization of multiple AC generators in an electrical power distribution system, and to an electrical power distribution system with mechanically phase-synchronized AC generators. According to a first aspect of the present invention, an apparatus for mechanical phase synchronization of multiple AC generators comprises: a gearbox mechanically coupled to a prime mover; multiple AC generators, each having a rotor driven by mechanical energy from the prime mover supplied via the gearbox to generate AC electrical power; and a mechanical linkage keying orientation of each rotor to the gearbox, thereby mechanically synchronizing phase of the multiple AC generators.

According to a second aspect of the present invention, an electrical power distribution system with mechanically phase-synchronized AC generators comprises: a gearbox mechanically coupled to a prime mover; an electrical power distribution bus; multiple AC generators, each having a rotor driven by mechanical energy from the prime mover supplied via the gearbox to generate AC electrical power; and a mechanical linkage keying orientation of each rotor to the gearbox, thereby mechanically synchronizing phase of the multiple AC generators.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
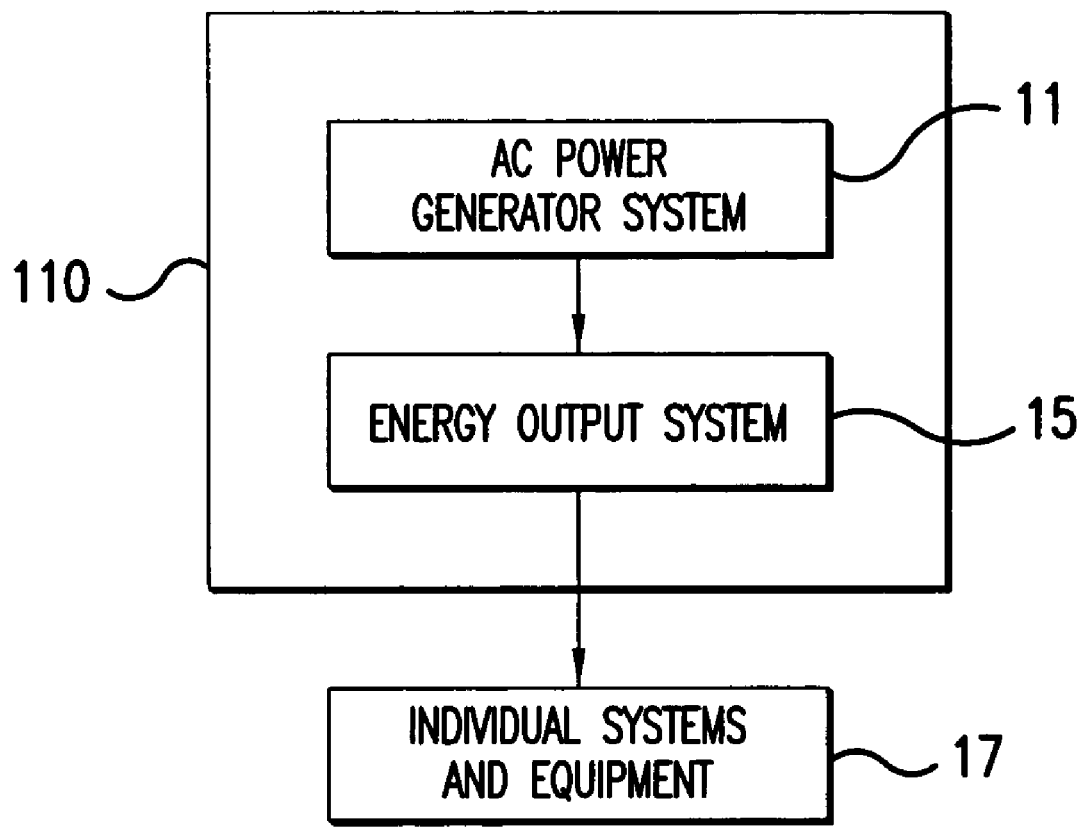
FIG. 1 is a general block diagram of an electrical system containing an electrical power distribution system according to an embodiment of the present invention.

Aspects of the invention are more specifically set forth in the accompanying description with reference to the appended figures. FIG. 1 is a general block diagram of an electrical system containing an electrical power distribution system according to an embodiment of the present invention. The electrical system 100 illustrated in FIG. 1 includes the following components: an AC power generator system 11; an energy output system 15; and individual systems and equipment 17. The AC power generator system 11 and the energy output system 15 form an electrical power distribution system 110. Operation of the electrical system 100 in FIG. 1 will become apparent from the following discussion.

AC power generator system 11 provides electrical power to electrical system 100 that may be a vehicle, a laboratory facility, a large appliance, or another electrically driven system. AC power generator system 11 may be associated with an automobile engine; an aircraft engine; a ship engine; a generator; or a collection of generators. Airborne vehicle use is the most likely application since generator sizes are limited for airborne vehicle applications. Portable power stations (up to around 1 MW) driven by diesel or turbine engines, ground based vehicles, and ships may also have generator size limitations. Energy output system 15, which distributes the electrical power produced by AC power generator system 11 to individual systems and equipment 17, may contain distribution busses, switches, contactors, and motors. Individual systems and equipment 17 are elements that enable functioning of services in electrical system 100. Such services may be an electric motor, an automatic braking system, an electrical light that can be turned on inside a vehicle, a remote control system onboard an aircraft, etc.

Figure 2A:
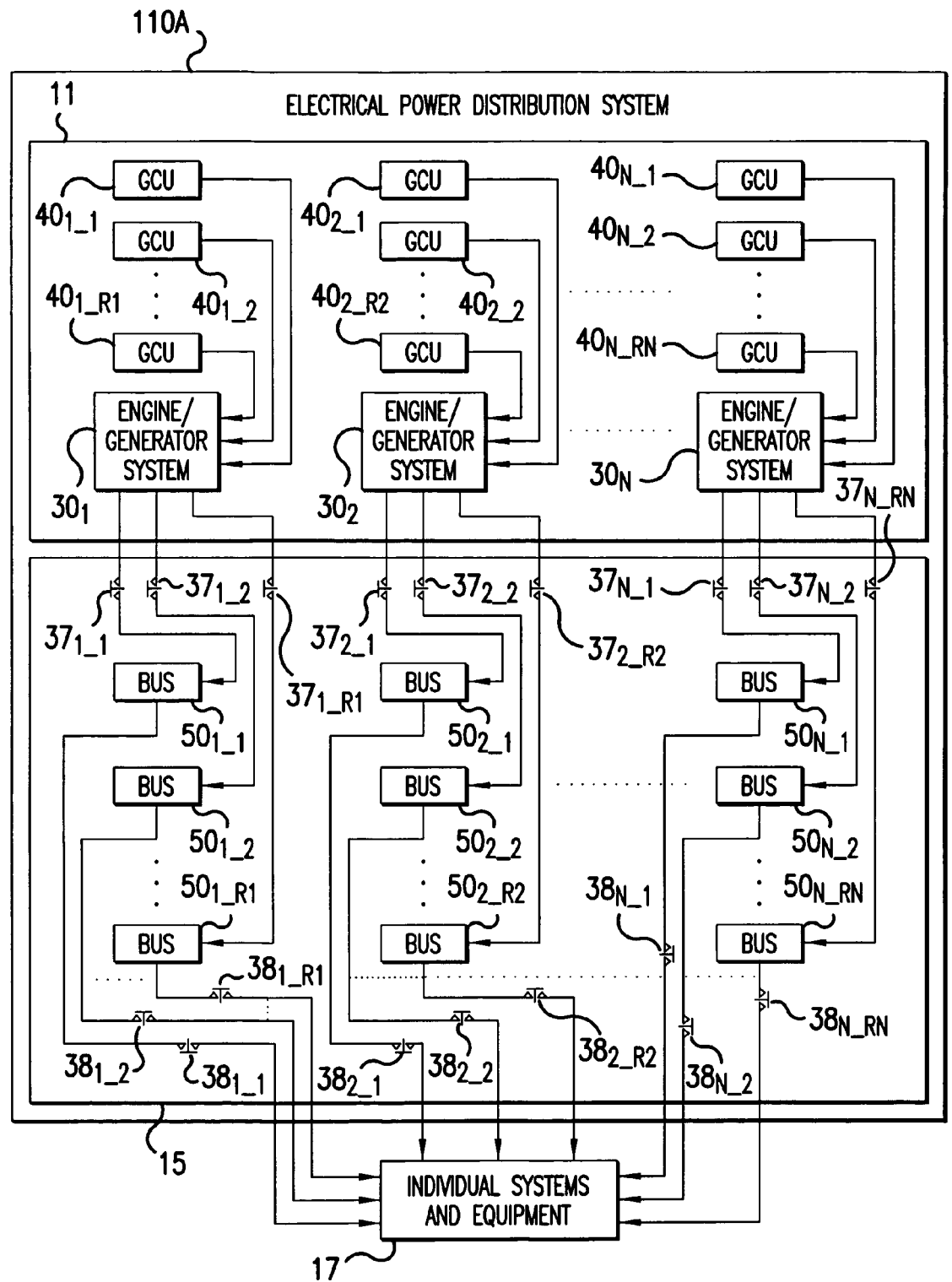
FIG. 2A is a block diagram of an electrical power distribution system with non-synchronized AC generator primary bus layout included in an electrical system.

FIG. 2A is a block diagram of an electrical power distribution system 110A with non-synchronized AC generator primary bus layout included in an electrical system 100. The electrical power distribution system 110A includes the following components: N number of engine/generator systems $30_1, 30_2, \ldots, 30_N$; R1 number of General Control Units (GCUs) $40_{1\_1}, 40_{1\_2}, \ldots 40_{1\_R1}$ and R1 number of busses $50_{1\_1}, 50_{1\_2}, \ldots, 50_{1\_R1}$ connected to engine/generator system $30_1$; R2 number of GCUs $40_{2\_1}, 40_{2\_2}, \ldots, 40_{2\_R2}$ and R2 number of busses $50_{2\_1}, 50_{2\_2}, \ldots 50_{2\_R2}$ connected to engine/generator system $30_2$; and so on, up to RN number of GCUs $40_{N\_1}, 40_{N\_2}, \ldots, 40_{N\_RN}$ and RN number of busses $50_{N\_1}, 50_{N\_2}, \ldots, 50_{N\_RN}$ connected to engine/generator system $30_N$. Energy produced by engine/generator system $30_1$ is distributed to individual systems and equipment 17 through busses $50_{1\_1}, 50_{1\_2}, \ldots, 50_{1\_R1}$. GCUs $40_{1\_1}, 40_{1\_2}, \ldots, 40_{1\_R1}$ control energy production of engine/generator system $30_1$. Operation of engine/generator systems $30_2, \ldots, 30_N$ is similar to operation of engine/generator system $30_1$. GCUs $40_{i\_k}$, where subscript "i" takes values between 1 and N, and subscript "k" takes values between 1 and Ri, may be microprocessors, digital circuits, analog circuits or any combination thereof. Bus $50_{i\_k}$ connects to engine/generator system $30_i$ through contactor $37_{i\_k}$, and to individual systems and equipment 17 through contactor $38_{i\_k}$, where subscript "i" takes values between 1 and N, and subscript "k" takes values between 1 and Ri. More than one contactor may connect a bus to individual systems and equipment 17. Contactors may also connect any two busses. Engine/generator systems $30_1, 30_2 \ldots 30_N$ and GCUs $40_{1\_1}, 40_{1\_2}, \ldots 40_{1\_R1}, 40_{2\_1}, 40_{2\_2} \ldots 40_{2\_R2}, \ldots 40_{N\_1}, 40_{N\_2} \ldots 40_{N\_RN}$ belong to AC power generator system 11. Busses $50_{1\_1}, 50_{1\_2} \ldots 50_{1\_R1}, 50_{2\_1}, 50_{2\_2} \ldots 50_{2\_R2}, \ldots 50_{N\_1}, 50_{N\_2} \ldots 50_{N\_RN}$ and contactors $37_{1\_1}, 37_{1\_2} \ldots 37_{1\_R1}, 37_{2\_1}, 37_{2\_2} \ldots 37_{2\_R2}, \ldots 37_{N\_1}, 37_{N\_2} \ldots 37_{N\_RN}, 38_{1\_1}, 38_{1\_2} \ldots 38_{1\_R1}, 38_{2\_1}, 38_{2\_2} \ldots 38_{2\_R2}, \ldots 38_{N\_1}, 38_{N\_2} \ldots 38_{N\_RN}$ belong to energy output system 15. Any additional contactors connecting busses to individual systems and equipment 17, and to other busses, are part of energy output system 15.

Figure 2B:
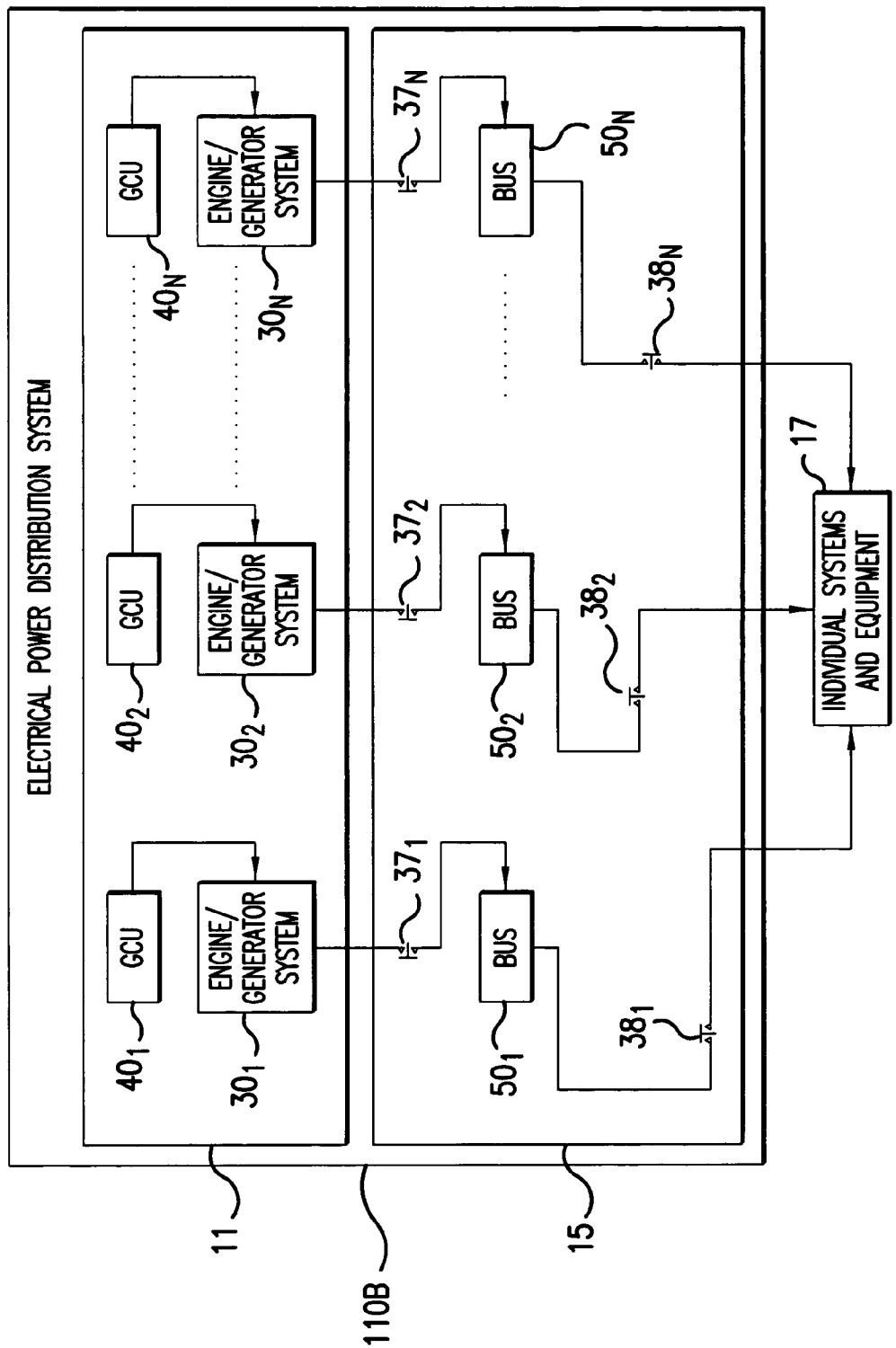
FIG. 2B is a block diagram of an electrical power distribution system with a synchronized AC generator primary bus layout included in an electrical system according to an embodiment of the present invention illustrated in FIG. 1.

FIG. 2B is a block diagram of an electrical power distribution system 110B with a synchronized AC generator primary bus layout included in an electrical system 100 according to an embodiment of the present invention illustrated in FIG. 1. The amount of energy output to individual systems and equipment 17 by electrical power distribution system 110B is the same as the amount of energy output to individual systems and equipment 17 by electrical power distribution system 110A in FIG. 2A. The electrical power distribution system 110B includes the following components: N number of engine/generator systems $30_1, 30_2 \ldots 30_N$; N number of General Control Units (GCUs) $40_1, 40_2 \ldots 40_N$; and N number of busses $50_1, 50_2 \ldots 50_N$. Engine/generator system $30_1$ is controlled by GCU $40_1$ and sends generated electrical power to bus $50_1$ which connects to contactors $37_1$ and $38_1$; engine/generator system $30_2$ is controlled by GCU $40_2$ and sends generated electrical power to bus $50_2$ which connects to contactors $37_2$ and $38_2$; and so on, to engine/generator system $30_N$ which is controlled by GCU $40_N$ and sends generated electrical power to bus $50_N$ which connects to contactors $37_N$ and $38_N$. Energy produced by electrical power distribution system 110B is sent to individual systems and equipment 17. Engine/generator systems $30_1, 30_2 \ldots 30_N$ and GCUs $40_1, 40_2 \ldots 40_N$ belong to AC power generator system 11. Busses $50_1, 50_2 \ldots 50_N$ and contactors $37_1, 37_2 \ldots 37_N$ and $38_1, 38_2 \ldots 38_N$ belong to energy output system 15.

Figure 3:
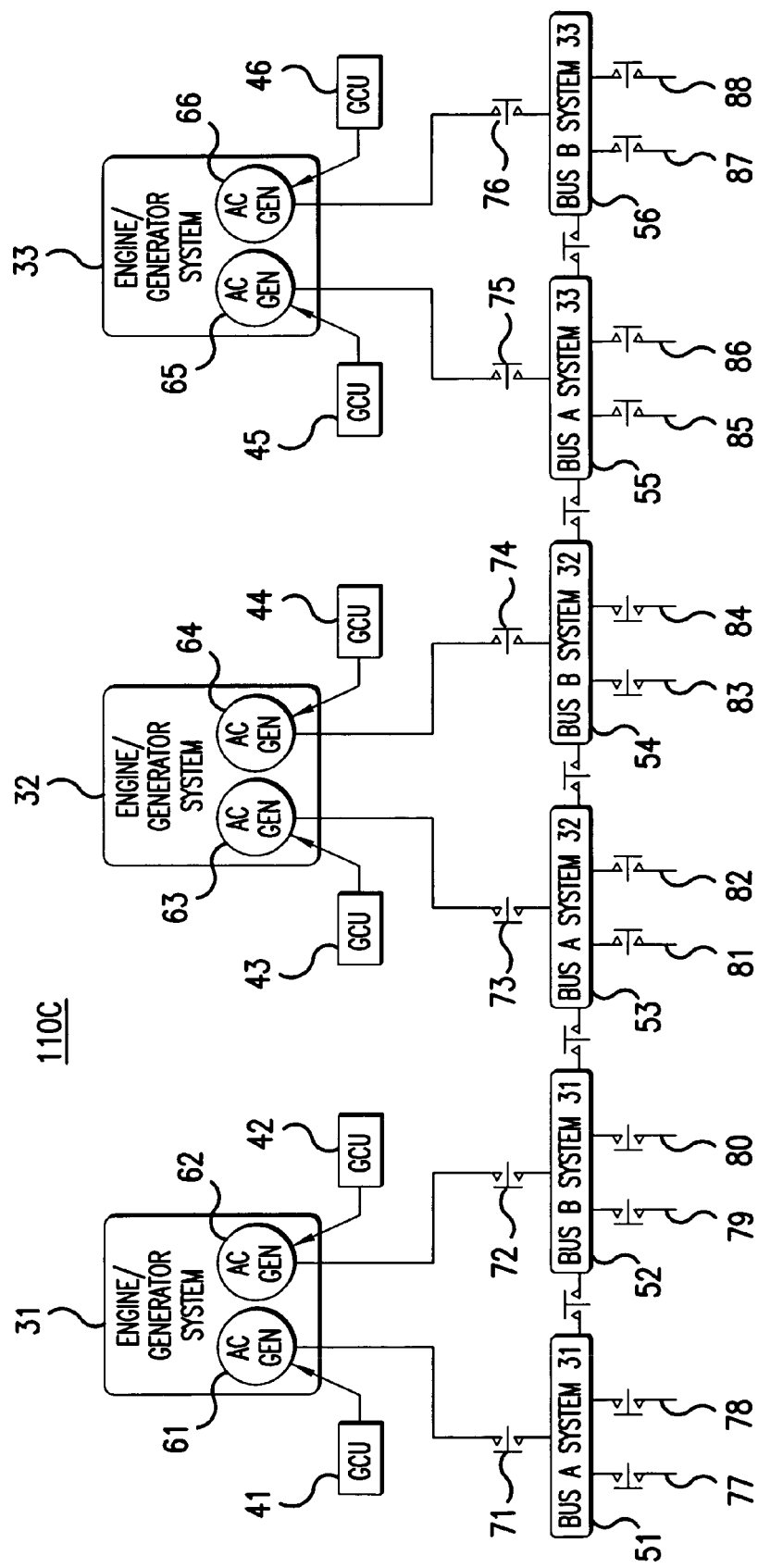
FIG. 3 illustrates an exemplary electrical power distribution system with non-synchronized AC generator primary bus layout.

FIG. 3 illustrates an exemplary electrical power distribution system 110C with non-synchronized AC generator primary bus layout included in an electrical system 100. Electrical power distribution system 110C includes the following components: engine/generator systems 31, 32 and 33; GCUs 41, 42, 43, 44, 45, 46; AC generators 61, 62, 63, 64, 65, 66; busses 51, 52, 53, 54, 55, and 56; and contactors 71, 72, 73, 74, 75, 76, 77, 78, 79, 80, 81, 82, 83, 84, 85, 86, 87, 88. AC generator 61 is associated with engine/generator system 31, is controlled by GCU 41, and sends generated electrical power to bus 51 which connects to contactors 71, 77, and 78; AC generator 62 is associated with engine/generator system 31, is controlled by GCU 42, and sends generated electrical power to bus 52 which connects to contactors 72, 79, and 80; AC generator 63 is associated with engine/generator system 32, is controlled by GCU 43, and sends generated electrical power to bus 53 which connects to contactors 73, 81, and 82; AC generator 64 is associated with engine/generator system 32, is controlled by GCU 44, and sends generated electrical power to bus 54 which connects to contactors 74, 83, and 84; AC generator 65 is associated with engine/generator system 33, is controlled by GCU 45, and sends generated electrical power to bus 55 which connects to contactors 75, 85, and 86; and AC generator 66 is associated with engine/generator system 33, is controlled by GCU 46, and sends generated electrical power to bus 56 which connects to contactors 76, 87, and 88. Engine/generator systems 31, 32 and 33 may contain additional AC generators. AC generators 61, 62, 63, 64, 65, 66 may be AC fixed frequency or variable frequency generators, providing high electrical power output. AC generators 61 and 62, 63 and 64, and 65 and 66 associated with each engine/generator system are not synchronized in phase and voltage. The outputs of non-synchronized AC generators cannot be combined. If, for example, the outputs of non-synchronized AC generators 61 and 62 were combined, current and voltage would be transferred between generators 61 and 62 without reaching energy output system 15. If the frequency and voltage mismatch between generators 61 and 62 outputs is large, the combined output of generators 61 and 62 can become unstable, leading to shutdown of electrical system 100 by its electrical protection systems or, in case of failure of electrical protection systems, leading to damage of electrical system 100. Since the outputs of non-synchronized AC generators cannot be combined, each AC generator requires one individual GCU and one individual bus in order to generate and distribute electrical power. Hence, the more AC generators are present in electrical power distribution system 110C, the more busses and GCUs are needed for electrical power production and distribution. As the number of engines and AC generators per engine/generator system increases in electrical system 100, the complexity of electrical power distribution system 110C and of GCUs control interface becomes extensive.

Figure 4:
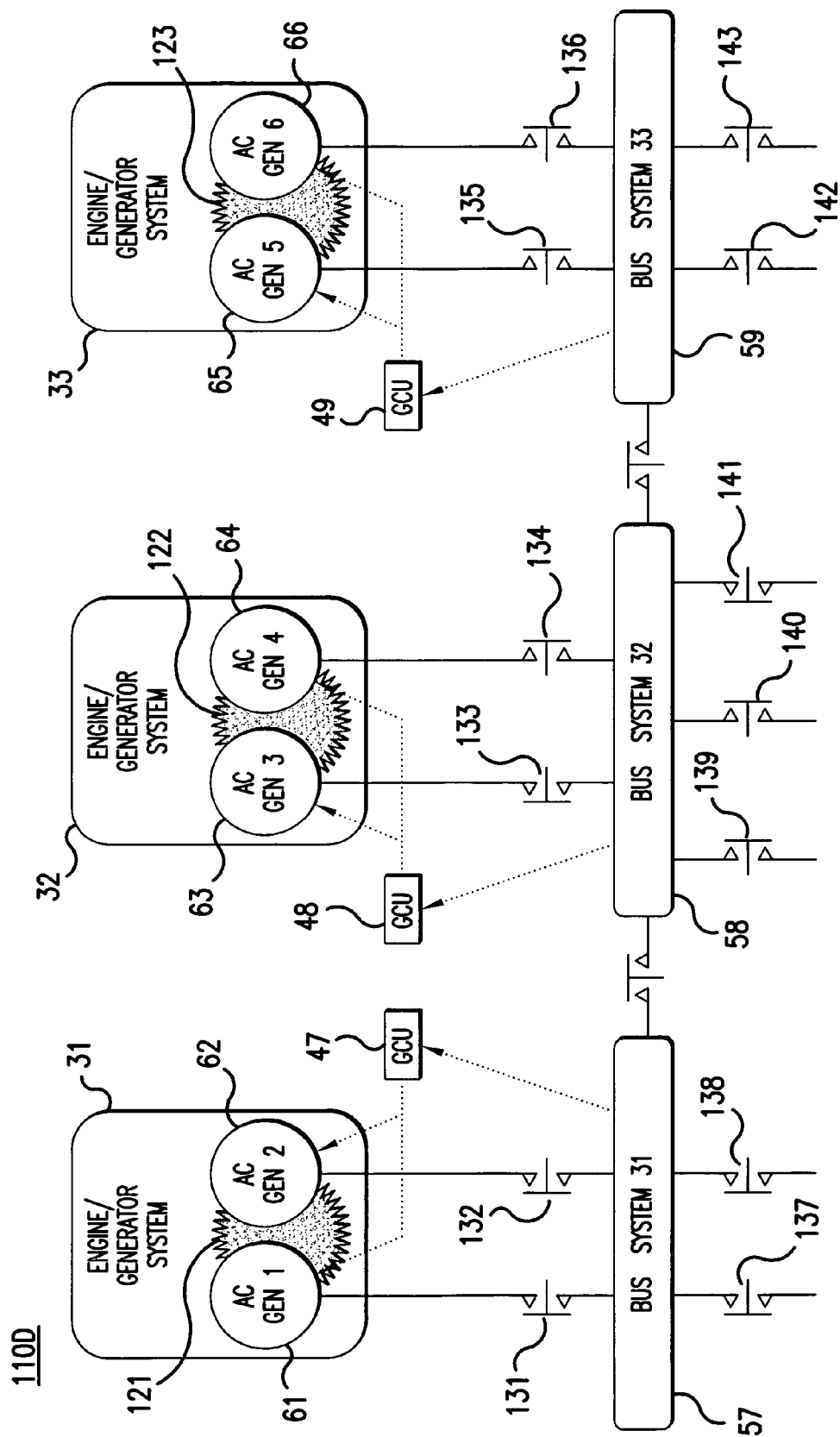
FIG. 4 illustrates an exemplary electrical power distribution system with a synchronized AC generator primary bus layout according to an embodiment of the present invention illustrated in FIG. 2B.

FIG. 4 illustrates an exemplary electrical power distribution system 110D with a synchronized AC generator primary bus layout according to an embodiment of the present invention illustrated in FIG. 2B. Electrical power distribution system 110D includes the following components: engine/generator systems 31, 32 and 33; GCUs 47, 48, 49; AC generators 61, 62, 63, 64, 65, 66; busses 57, 58, 59; and contactors 131, 132, 133, 134, 135, 136, 137, 138, 139, 140, 141, 142, 143. AC generators 61 and 62 associated with engine/generator system 31 are synchronized by synchronizing geartrain 121, are controlled by GCU 47, and send generated electrical power to bus 57 which connects to contactors 131, 132, 137 and 138; AC generators 63 and 64 associated with engine/generator system 32 are synchronized by synchronizing geartrain 122, are controlled by GCU 48, and send generated electrical power to bus 58 which connects to contactors 133, 134, 139, 140 and 141; and AC generators 65 and 66 associated with engine/generator system 33 are synchronized by synchronizing geartrain 123, are controlled by GCU 49, and send generated electrical power to bus 59 which connects to contactors 135, 136, 142 and 143. Engine/generator systems 31, 32 and 33 may contain additional synchronized AC generators. AC generators 61, 62, 63, 64, 65, 66 may be AC variable frequency (VF) generators providing high electrical power output. Synchronizing geartrains 121, 122 and 123 synchronize generator pairs 61 and 62, 63 and 64, and 65 and 66 respectively, in phase rotation and in voltage regulation.

Generators that are phase synchronized are also voltage synchronized, since the phase position is defined by the voltage waveform. Voltage outputs from the two parallel generators in each pair need to be similar in value, since an imbalance in voltage outputs would produce a potential difference between the two parallel generators. Such a potential difference would cause circulating (reverse) currents on the primary power feeder cables.

Before closing the line contactors from each generator to the common bus, the GCUs adjust the voltages of paired generators to the same level. When line contactors are closed, current will not be transferred between the two generators in each pair, since both generator outputs are at the same voltage. Hence, the generators' power will be delivered to the bus. The GCUs may measure current to ensure that the generators share the load equally. In addition, GCUs control excitation to both generators by a suitable designed transfer function, to maintain the collective voltage output within accepted limits of voltage for the system.

When two or more AC VF generators are synchronized in phase and voltage, they can be driven from one gearbox and function as one unit. The outputs of synchronized AC VF generators can thus be safely combined, so that that only one GCU and only one bus are necessary to control synchronized AC VF generators. When all VF AC generators associated with every engine/generator system are synchronized, the total number of buses and GCUs in electrical power distribution system 110D can be reduced to the number of engine/generator systems in AC power generator system 11. In synchronized electrical power distribution system 110D for example, the total numbers of busses and GCUs have been reduced to 50% of total numbers of buses and GCUs present in non-synchronized electrical power distribution system 110C from FIG. 3. Smaller numbers of busses and GCUs greatly reduce the complexity of electrical power distribution system 110D, reducing cost and weight while increasing reliability. In synchronized electrical power distribution system 110D the total number of contactors connected to busses is also reduced compared to the total number of contactors in non-synchronized electrical power distribution system 110C.

The classification of AC generators, such as VF or CF type generators, refers to the type of prime mover system that the AC generators are permitted to operate and interface with. CF generators are defined as generators with a design frequency bandwidth between 380 Hz and 420 Hz. By contrast, VF generators have frequency bandwidths outside the 380 Hz to 420 Hz range. The frequency bandwidth of VF generators is usually centered around or about 400 Hz, but is free to vary over the governing prime mover speed range. Variable frequency may also have design implications for the AC generators, by impacting their frequency range. AC generators 61, 62, 63, 64, 65, 66 can be other kinds of generators as well besides AC VF generators. As an example, AC generators 61, 62, 63, 64, 65, 66 can be engine generators used in propulsion engine applications. In propulsion engine applications, the generators spin at the speed of the turbine that corresponds to engine thrust or horsepower requirements. The speed on a propulsion engine normally varies over a wider range that the range of VF generators. Hence, the output frequency of engine generators can typically fall outside what is considered by convention to be a fixed or constant frequency between 380 Hz and 420 Hz. The present embodiment indexes the alignment of the phases between generators that are driven from the same prime mover, regardless of generators' type, speed, frequency, or classification. The present embodiment provides a synchronized phase relationship between multiple AC generators driven at the same variable or constant speed, and by the same prime mover.

The current embodiment synchronizes generators regardless of the frequency at which the generators run. Generators used in airborne equipment, e.g. designed to run on a supply frequency nominally around 400 Hz, can be synchronized. AC VF generators with high frequency tolerance band, as well as constant frequency (CF) generators with lower frequency tolerance band, can be synchronized. Generators for other system applications may have frequency values in various ranges. For example, ground-based systems running with commercial equipment are designed for use with 60 Hz power supplies. Prime movers can vary in their optimally efficient speed ranges. Those ranges are typically much different from ranges that could directly drive a generator. Therefore, a speed reducing or multiplying gearbox can be used to obtain a suitable drive speed for generators from a prime mover. Typical choices of generators (and associated drive speeds) for vehicle applications are, by design, in multiples of 2. Hence, 2 pole (24,000 rpm), 4 pole (12,000 rpm) and 6 pole (8,000 rpm) generators may be used.

Some trimming of the excitation for the AC generators may be necessary in order to compensate for machine construction variability. The need for excitation trimming arises from variations that may occur in the electrical transfer function properties of generators. An important control parameter for excitation trimming is the load sharing of two or more generators when connected in parallel. To control the load sharing of two or more generators connected in parallel, the GCU can control the excitation of the generators. The control ensures that the voltage output of generators is the same prior to connecting the generators in parallel. After the line contactors are closed and the generators are connected in parallel, the GCU can regulate the sum of generator outputs by comparing the outputs to the required voltage of the system. GCU can also ensure that the output currents from parallel generators are close enough in magnitude. Hence, circulating currents between generators are prevented. Measurement of output current per channel may also be performed, to ensure equal load sharing between AC generators. Current transformers may be included in the generator system for this purpose. Alternately, the current transformers may be substituted with Hall effect sensors or similar devices to provide control feedback for load sharing purposes. The current transformers or other sensors can be part of a differential protection loop used to detect feeder cable faults. A current transformer in a differential protection loop may also be used to provide load-sharing feedback and additional functions without additional system hardware. The GCUs can then use the feedback to modify generator field excitation.

Figure 5:
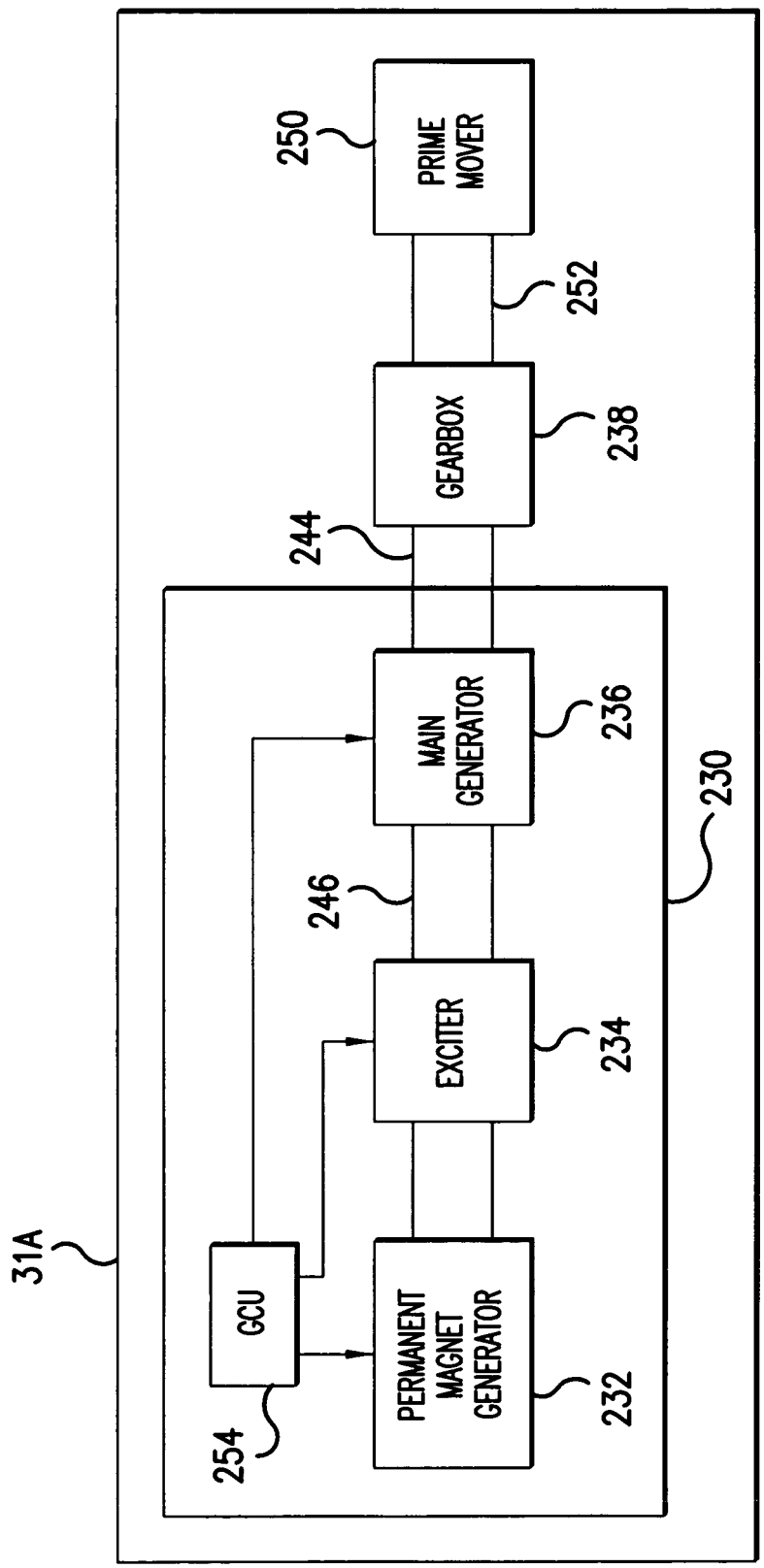
FIG. 5 is a block diagram of an exemplary AC variable frequency generator included in an AC power generator system according to an embodiment of the present invention illustrated in FIG. 2B.

FIG. 5 is a block diagram of an exemplary AC variable frequency generator included in an AC power generator system 11 according to an embodiment of the present invention illustrated in FIG. 2B. Exemplary AC VF generator 230 is associated with an engine/generator system 31A belonging to AC power generator system 11. Engine/generator system 31A also includes a prime mover 250 and a gearbox 238. Prime mover 250 provides mechanical energy and may be a turbine or another system driven by water, wind, or fuel. Gearbox 238 is a mechanical engagement system that picks up on shaft 252 mechanical energy generated by prime mover 250. Gearbox 238 then sends the mechanical energy to AC VF generator 230 through gearbox interface spline section 244, which is connected to generator shaft 246. Shafts 244 and 246 may have different rotational speeds. AC VF generator 230 includes the following components: a main generator 236; an exciter 234; a permanent magnet generator 232; and a GCU 254. Main generator 236, exciter 234 and/or permanent magnet generator 232 have rotors that rotate as driven by generator shaft 246. GCU 254 controls main generator 236, exciter 234 and permanent magnet generator 232. Main generator 236, exciter 234 and permanent magnet generator 232 are electromechanical systems that may include armature windings, rectifiers, and permanent magnets for energy generation. Other types of AC VF generators may also be used in AC power generator system 11.

Figure 6:
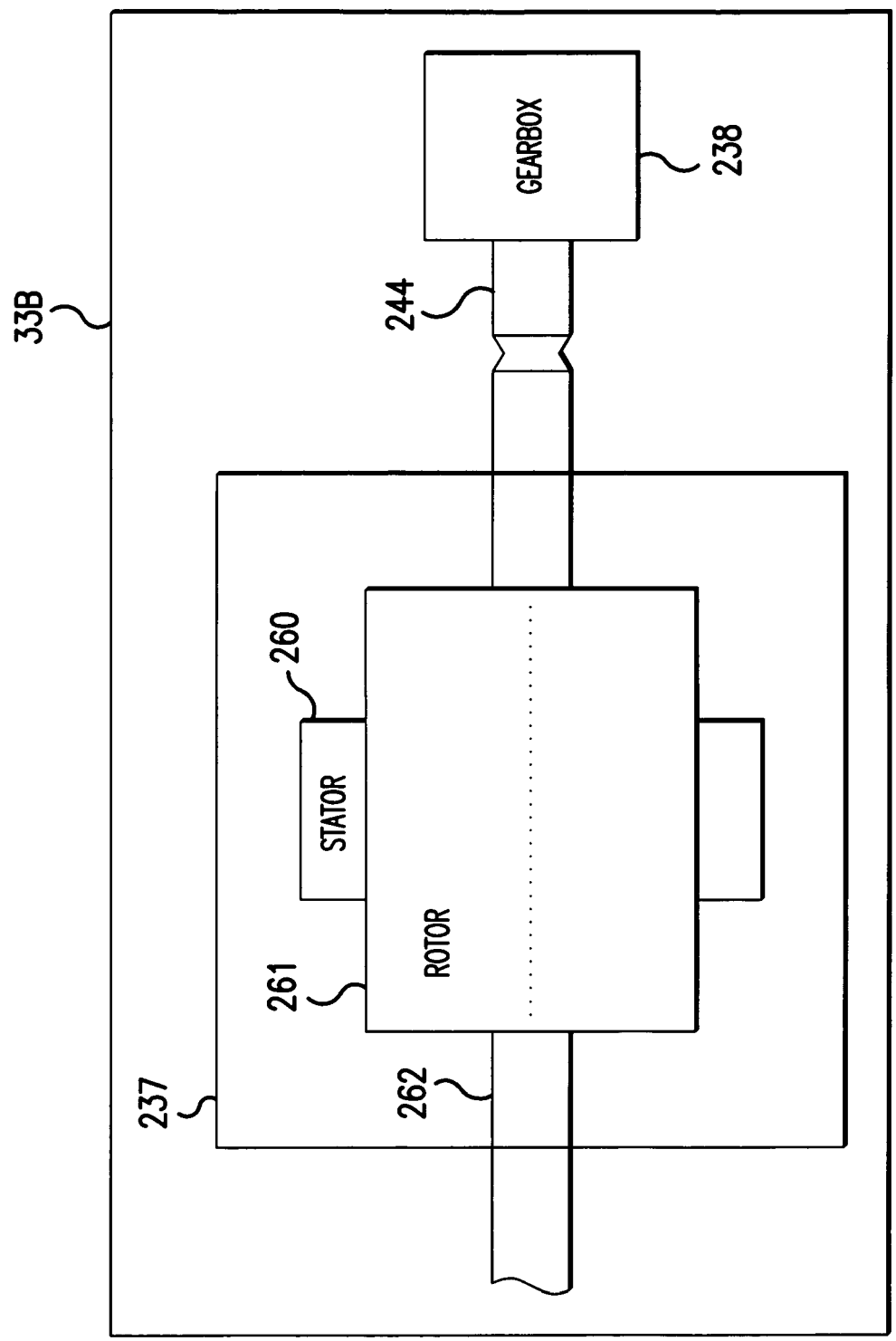
FIG. 6 illustrates a shaft engagement of an AC variable frequency generator included in an AC power generator system according to an embodiment of the present invention illustrated in FIG. 2B.

FIG. 6 illustrates a shaft engagement of an AC VF generator 237 included in an AC power generator system 11 according to an embodiment of the present invention illustrated in FIG. 2B. AC VF generator 237 is associated with an engine/generator system 33B that belongs to AC power generator system 11. AC VF generator 237 includes a stator 260 and a rotor 261. Rotor 261 rotates as driven by generator interface section 262, which receives rotation energy from gearbox interface spline section 244. Rotor 261 may be an electrical winding with DC current. As rotor 261 rotates, the DC current in rotor 261 creates a magnetic field that in turn creates an electric current in stator 260. The output of stator 260 is an AC voltage. AC VF generator 237 may be an AC VF generator such as the one illustrated in FIG. 5, with rotor 261 and stator 260 belonging to main generator 236; or it may be any other type of AC VF generator. Generator interface section 262 and gearbox interface spline section 244 may be splined shafts that engage splined recesses in rotor 261 and in gearbox 238 respectively.

If no phase synchronization of AC VF generator 237 is present, as is the case in existing designs, the spline pattern of generator interface section 262, of gearbox interface spline section 244, and of corresponding recesses in rotor 261 and gearbox 238 are uniformly indexed. In that case, engagement of generator interface section 262 to rotor 261, and of gearbox interface spline section 244 to gearbox 238 would be done randomly around a uniformly indexed spline surface.

Figure 7A:
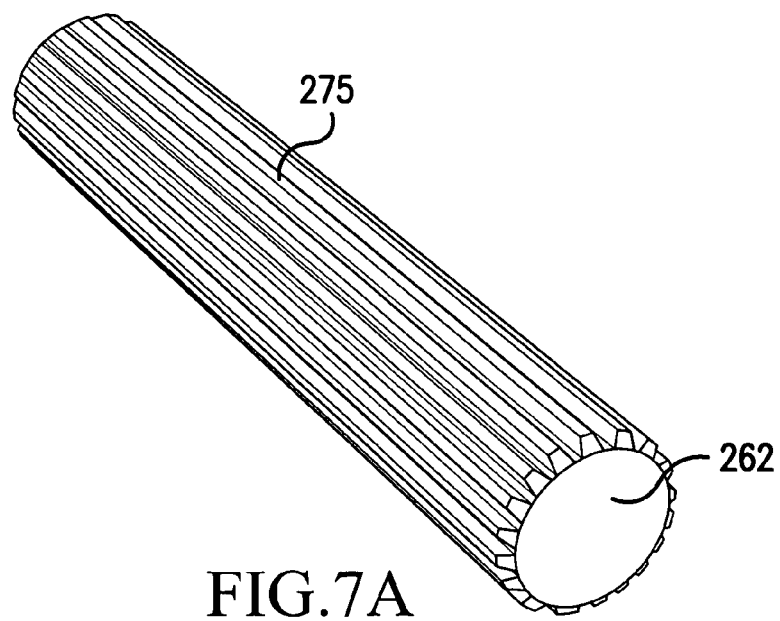
FIG. 7A illustrates an exemplary uniformly indexed splined shaft that engages an AC variable frequency generator included in an AC power generator system.

FIG. 7A illustrates an exemplary uniformly indexed splined shaft 262A that engages an AC VF generator 237 included in an AC power generator system 11. Surface 275 of shaft 262A presents uniformly indexed splines that engage a similarly splined recess in rotor 261 of an AC VF generator 237. Uniformly indexed surface 275 does not perform any synchronization function.

Figure 7B:
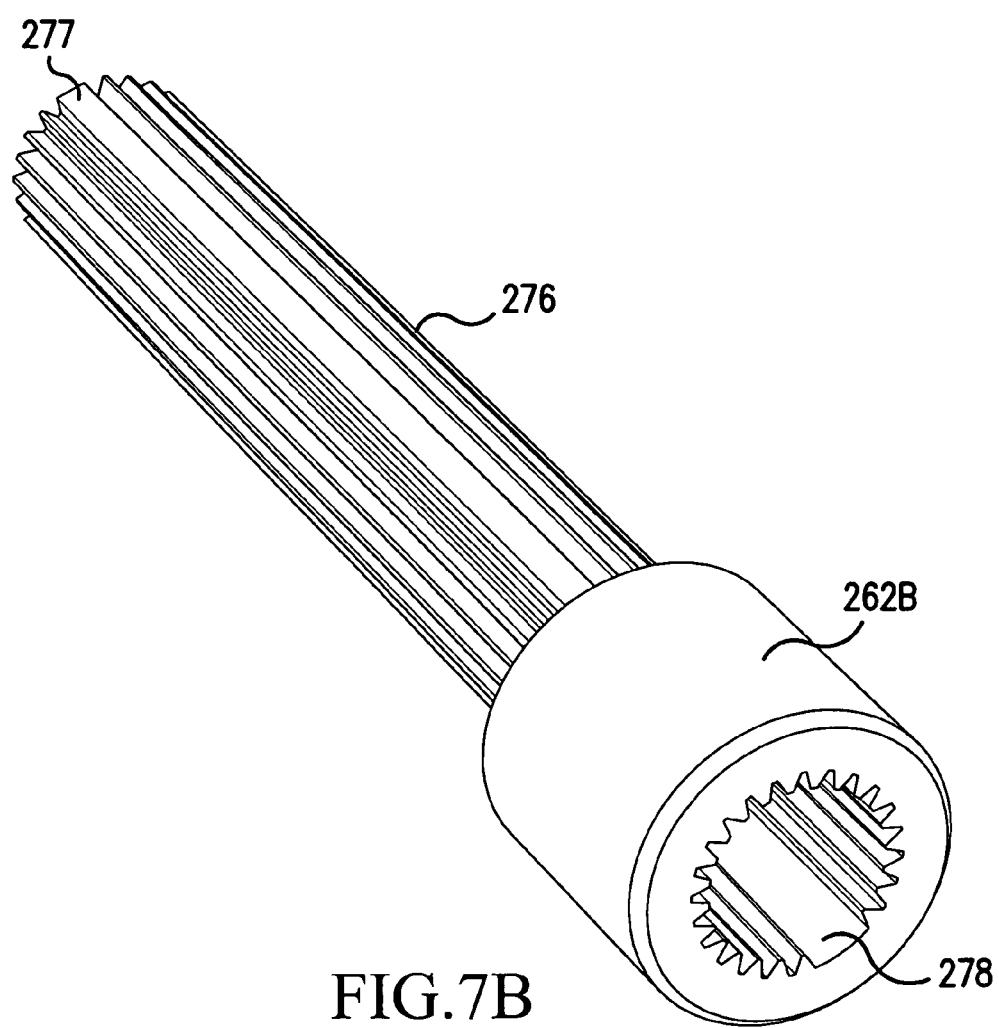
FIG. 7B illustrates an exemplary non-uniformly indexed splined shaft that engages an AC variable frequency generator included in an AC power generator system according to an embodiment of the present invention illustrated in FIG. 2B.

FIG. 7B illustrates an exemplary non-uniformly indexed splined shaft 262B that engages an AC VF generator 237 included in an AC power generator system 11 according to an embodiment of the present invention illustrated in FIG. 2B. Indexed splined shaft 262B has non-uniform laminations 277 on surface 276. The indexed splined shaft 262B drives the rotor of AC VF generator 237. The rotor slides over the non-uniform laminations 277 while positioning the generator poles (phases). Similar non-uniform laminations 278 for the female shaft that accepts indexed splined shaft 262B are present.

Figure 8:
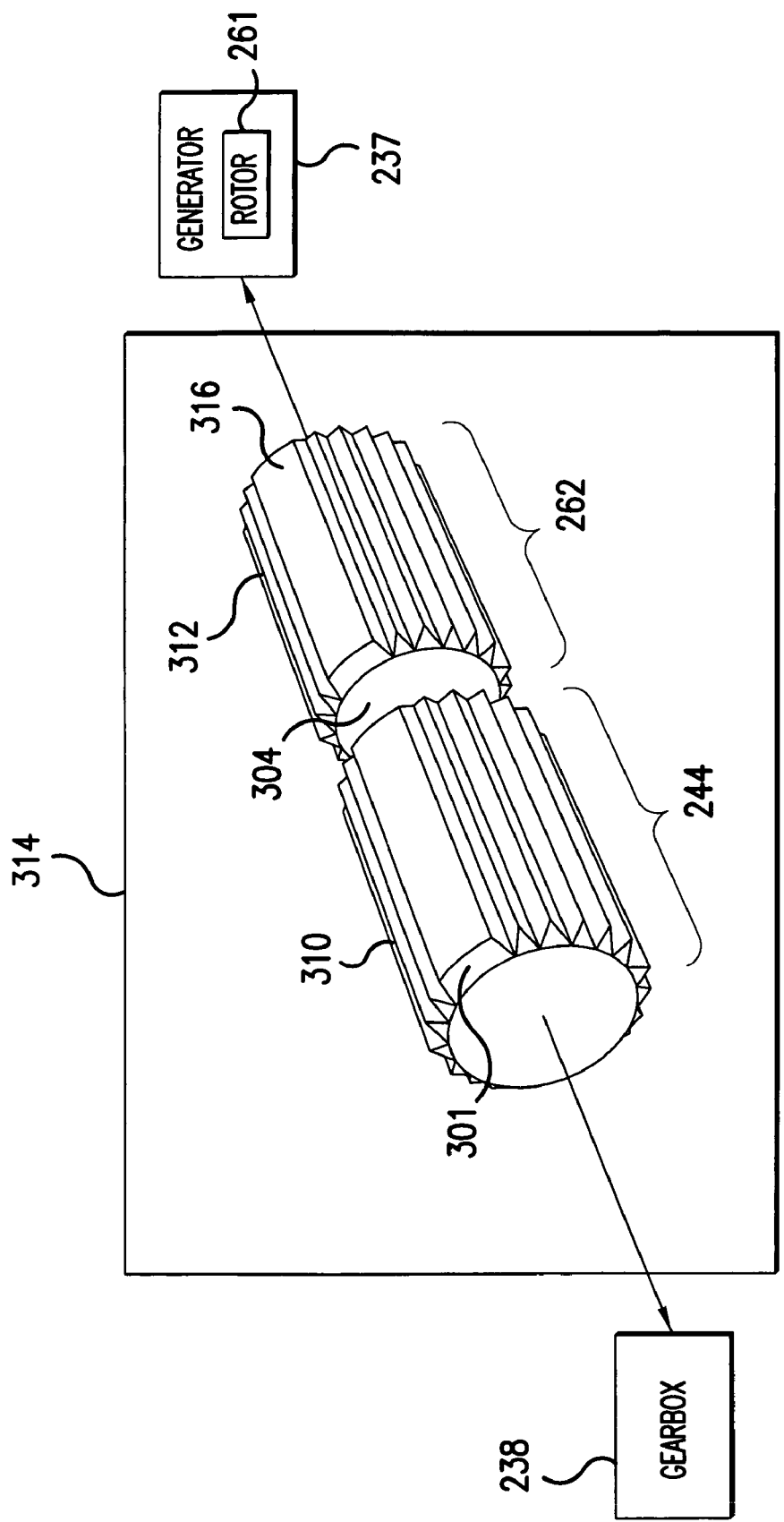
FIG. 8 illustrates an interface drive shaft with a keyed spline pattern for rotationally aligning an AC variable frequency generator to a similarly indexed gearbox shaft according to an embodiment of the present invention illustrated in FIG. 6.

FIG. 8 illustrates an interface drive shaft with a keyed spline pattern for rotationally aligning an AC VF generator 237 to a similarly indexed gearbox shaft according to an embodiment of the present invention illustrated in FIG. 6. Shaft 314 performs the function of synchronizing geartrain 121, 122 or 123 in FIG. 4 by way of allowing only one rotational alignment during the generator to gearbox assembly process. Shaft 314 has two parts: generator interface spline section 262 and gearbox interface spline section 244.

The rotor assembly 261 of AC VF generator 237 is driven by generator interface spline section 262 which is engaged through a suitable female spline coupling. Gearbox 238 drives gearbox interface spline section 244 through a similar coupling on the gearbox. Generator interface spline section 262 and gearbox interface spline section 244 are separated by a shear section cut-away 304. The surface 310 of gearbox interface spline section 244 contains a spline pattern with a keying arrangement such as a keyway slot 301 having several splines blanked over. The surface 312 of generator interface spline section 262 contains a spline pattern with a similar keyway slot 316. Rotor laminations in rotor assembly 261 of AC VF generator 237 contain a similarly keyed female mating spline that engages generator interface spline section 262, and gearbox 238 contains a similarly keyed female mating spline that engages gearbox interface spline section 244. The keying arrangement on shaft 314 allows AC VF generator 237 to engage to gearbox 238 in only one orientation. Other non-uniform spline patterns for shaft surfaces 310 and 312 allowing AC VF generator 237 to engage gearbox 238 in only one orientation may also be used. When gearbox 238 drives multiple AC VF generators placed in parallel on the non-uniform spline pattern shaft 314, all AC VF generators will have the same rotational orientation with respect to gearbox interface spline section 244 and with respect to each other; hence all AC VF generators will be synchronized between each other. The shear cut-away section 304 is machined to the tolerances necessary to provide proper shear torque. The manufacturing processes of gearbox 238 and of all parallel AC VF generators 237 engaged by shaft 314 ensure that keying arrangements 301 and 316 are in alignment for proper positioning of rotors 261 of all AC VF generators 237. Gearbox 238 may also contain multiple gearbox interface spline sections 244 property synchronized to each other by design and construction. Likewise, all parallel AC VF generators 237 are designed and constructed so as to ensure that the rotor and stator laminations in each AC VF generator are in the same location, and the keyed splines on all generator interface spline sections 262 are oriented the same way for each AC VF generator.

Figure 9A:
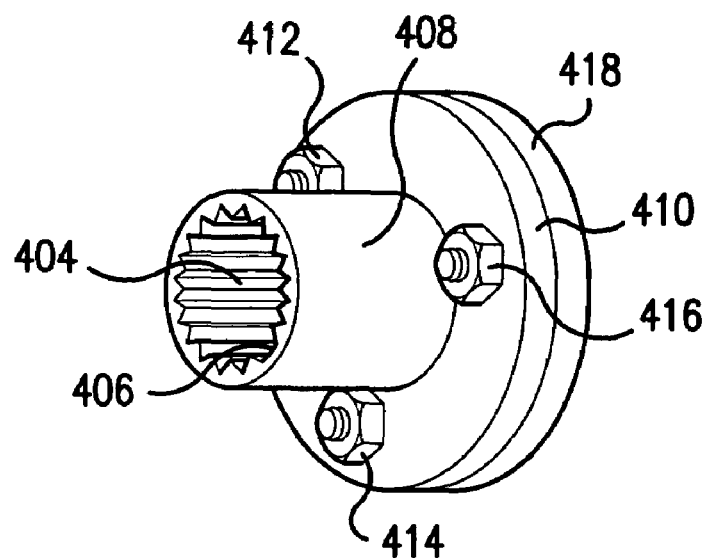
FIGS. 9A, 9B and 9C illustrate an arrangement and technique for fine rotational alignment of an AC variable frequency generator output shaft to rotor phase position in accordance with an embodiment of the present invention illustrated in FIG. 8.
Figure 9B:
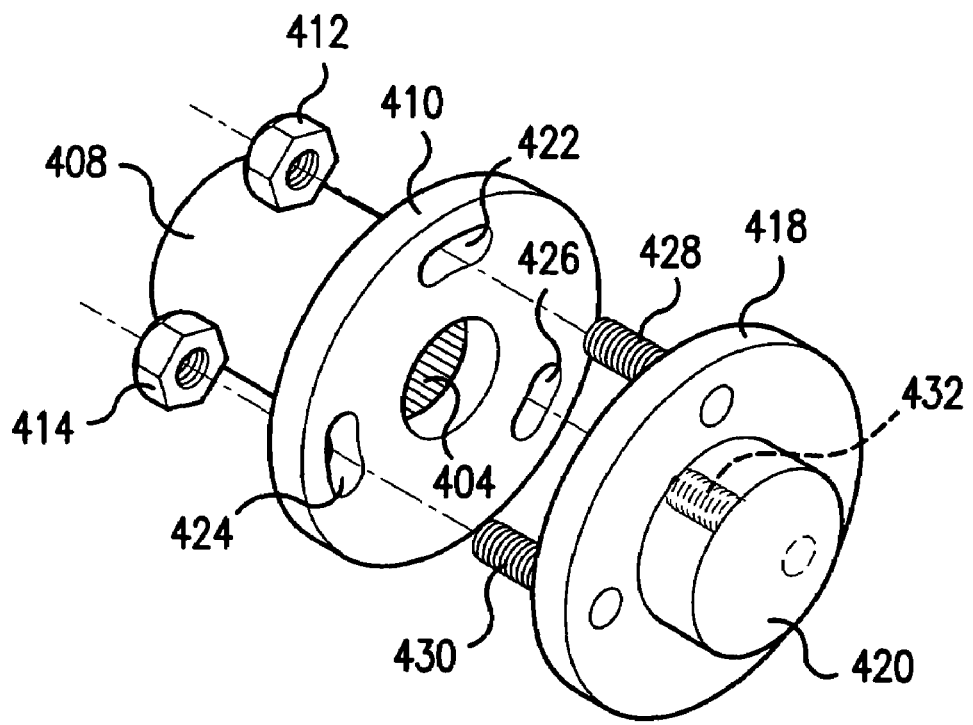
Figure 9C:
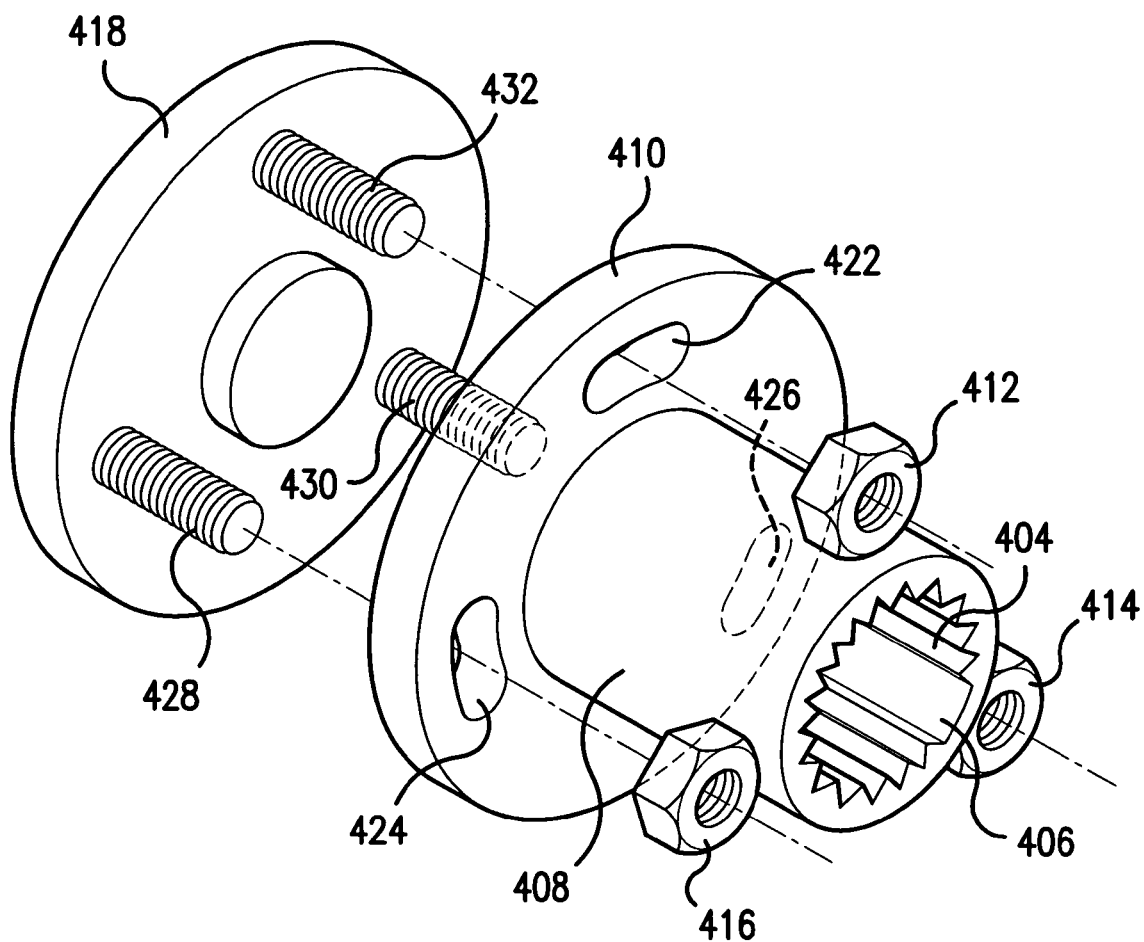

FIGS. 9A, 9B and 9C illustrate an arrangement and technique for fine rotational alignment of an AC VF generator 237 output shaft to rotor phase position in accordance with an embodiment of the present invention illustrated in FIG. 8. Views from different angles of the arrangement for fine rotational alignment of AC VF generator 237 output shaft to rotor phase position are present in FIGS. 9A, 9B and 9C. The arrangement in FIGS. 9A, 9B and 9C may be used when design and quality assurance techniques require that an AC VF generator phase synchronization be done with high precision. The arrangement in FIG. 9A includes two flanges 410 and 418 that enable angular adjustment. Flange 418 provides rotor shaft input for AC VF generator 237, while flange 410 provides gearbox drive shaft input 408 for a gearbox 238, using female mating spline 404 with keyway slot 406 with several splines blanked over. Locking nuts 412, 414 and 416 connect flanges 410 and 418. Slotted holes 422, 424 and 426 in flange 410 in FIG. 9B receive bolts 412, 414 and 416 from flange 418, on screws 427, 428 and 429. Slotted holes 422, 424 and 426 have larger diameter than screws 428, 430 and 432, allowing for several degrees of angular adjustment between flanges 410 and 418. Generator rotor shaft input 420 to flange assembly connects a generator rotor to flange 418. Spline keying 406 is used to initially position flanges 410 and 418 with respect to each other, then fine adjustment is accomplished using slotted bolt connections holes 422, 424 and 426.

Locking nuts 412, 414 and 416 are first loosened for adjustment and then tightened to clamp flanges 410 and 418 together. The angular adjustment between flanges 410 and 418 can be implemented as part of the final test and calibration of AC VF generator 237.

Figure 10:
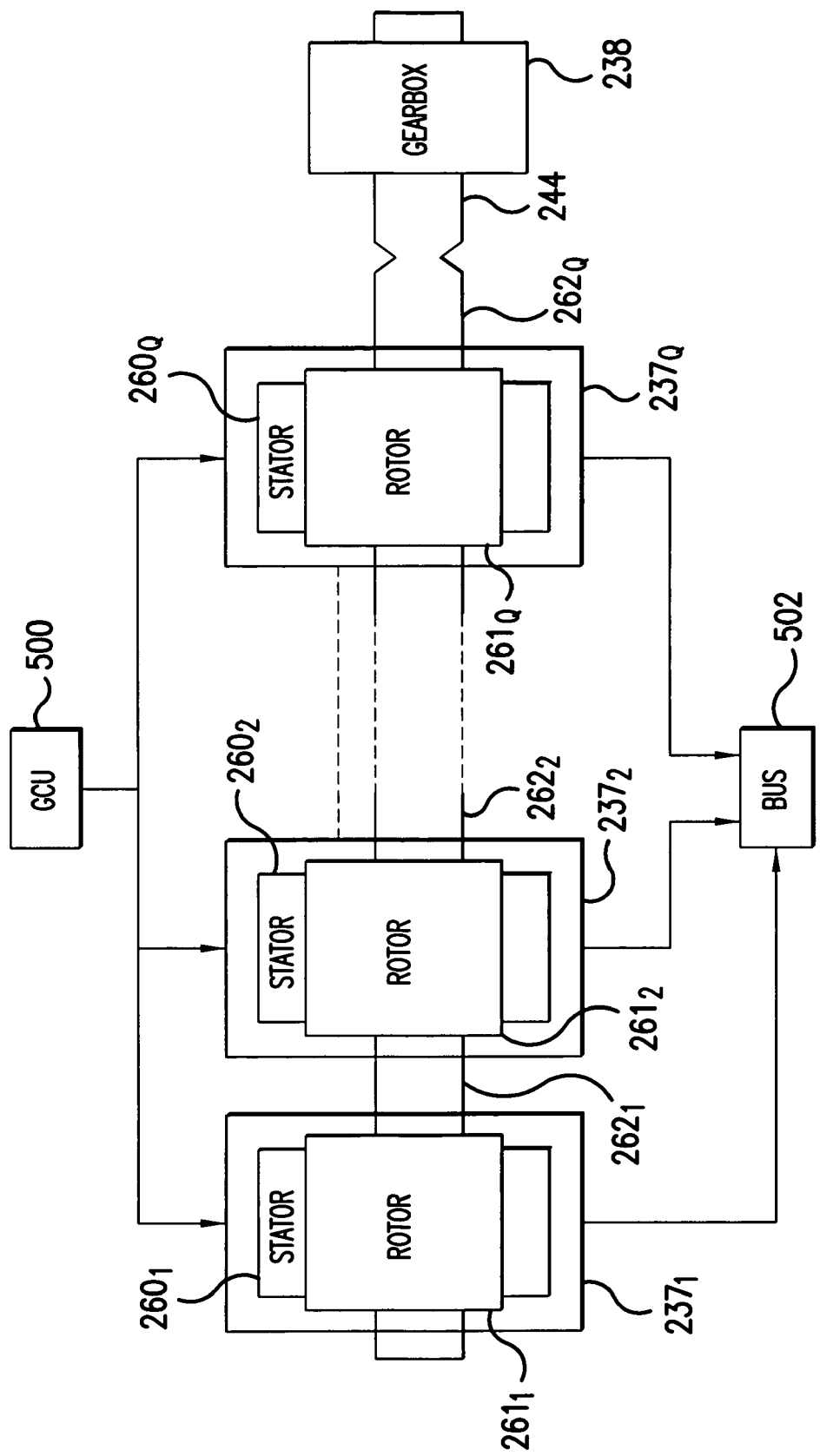
FIG. 10 illustrates a synchronized chain of AC variable frequency generators associated with an AC power generator system according to an embodiment of the present invention illustrated in FIG. 2B.

FIG. 10 illustrates a synchronized chain of AC variable frequency generators associated with an AC power generator system 11 according to an embodiment of the present invention illustrated in FIG. 2B. Gearbox interface spline section 244 of gearbox 238 synchronizes AC generators $237_1$, $237_2, \ldots, 237_Q$ through rotor shafts $262_1, 262_2, \ldots, 262_Q$ that connect to rotors $261_1, 261_2, \ldots, 261_Q$. Rotor shafts $262_1, 262_2, \ldots, 262_Q$ perform the function of synchronizing geartrains 121, 122 and 123 in FIG. 4. One GCU 500 controls all synchronized generators $237_1, 237_2, \ldots, 237_Q$, and one bus 502 distributes the combined electrical output of all generators.

I claim:

1. An apparatus for providing phase-synchronized alternating current (AC) power from multiple AC generators, said apparatus comprising:
    a plurality of AC generators;
    an AC power bus directly connectable to all of the AC generators;
    a gearbox mechanically coupled to a prime mover;
        the gearbox having an interface drive shaft receptacle attached thereto;
    the AC generators each having a rotor driven by mechanical energy from said prime mover supplied via said gearbox to generate AC electrical power;
        each of the rotors having a interface drive shaft receptacle attached thereto;
    all of the AC generators producing AC electrical power that is equal in phase-synchronization so that circulating currents among the AC generators are precluded;
    common interface drive shafts each with a keyed spline pattern at the gearbox and each of the multiple AC generators, the keyed spline pattern allowing only one orientation for insertion in a corresponding gearbox receptacle and a corresponding generator drive shaft receptacle, said interface drive shaft keying an orientation of each rotor of each of the multiple AC generators to said gearbox, said gearbox receptacle and said generator drive shaft receptacles each being fixed in rotational position and turning at identical speed, said generator drive shaft receptacle being fixed in rotational position relative to a phase output power of the generator ;and
    wherein each of the AC generators are arranged such that the interface drive shafts drive each of the AC generators.

2. The apparatus for mechanical phase synchronization of multiple AC generators as recited in claim 1, wherein said multiple AC generators are finely aligned to said rotor phase position using pairs of flanges, which are connected using a slotted bolt arrangement that allows angular adjustment.

3. The apparatus for mechanical phase synchronization of multiple AC generators as recited in claim 2, wherein at least one flange from said pairs of flanges is connected to said gearbox.

4. The apparatus for mechanical phase synchronization of multiple AC generators as recited in claim 1, where said multiple AC generators are variable frequency generators.

5. The apparatus for mechanical phase synchronization of multiple AC generators as recited in claim 1, where said multiple AC generators are variable frequency generators.

6. The apparatus for mechanical phase synchronization of multiple AC generators as recited in claim 1, wherein said multiple AC generators send generated power to one electrical power distribution bus that supplies said generated power to a variable frequency system.

7. The apparatus for mechanical phase synchronization of multiple AC generators as recited in claim 1, wherein said prime mover is an aircraft turbine engine.

8. An apparatus for providing AC power from multiple AC variable frequency generators, said apparatus comprising:
an AC power bus;
multiple AC variable frequency generators directly connectable to the AC power bus without use of intervening rectifiers and inverters;
a gearbox mechanically coupled to a prime mover;
the multiple AC variable frequency generators each having a rotor driven by mechanical energy from said prime mover supplied via said gearbox to generate AC electrical power; and
at least one non-uniformly indexed splined shaft keying orientation of each rotor to said gearbox, thereby mechanically synchronizing phase of said multiple AC variable frequency generators, said non-uniformly indexed splined shaft synchronizing phase of said multiple AC variable frequency generators by aligning rotational position of said multiple AC variable frequency generators with a gearbox drive pad of said gearbox using drive shafts with spline keying, and finely aligning an output shaft from among said drive shafts of each of said multiple AC variable frequency generators to rotor phase position using pairs of flanges which are connected using a slotted bolt arrangement that allows angular adjustment, at least one flange from said pairs of flanges being connected to said gearbox.

9. An electrical power distribution system comprising:
a gearbox mechanically coupled to a prime mover;
an AC electrical power distribution bus;
multiple AC generators;
each of the multiple AC generators being directly connectable to the AC electrical power bus to supply AC electrical power to the bus at a voltage and at a phase relationship produced by all of the multiple AC generators;
the multiple AC generators, each having a rotor driven by mechanical energy from said prime mover supplied via said gearbox to generate AC electrical power; and
a common non-uniformly indexed splined shaft, the splined shaft keying only a single orientation of each rotor to a single orientation of said gearbox, thereby mechanically synchronizing phase of said multiple AC generators.

10. The electrical power distribution system according to claim 9, wherein said splined shaft phase synchronizes said multiple AC generators by aligning rotational position of said multiple AC generators with a gearbox drive pad of said gearbox, using drive shafts with spline keying.

11. The electrical power distribution system according to claim 10, wherein an output shaft of each of said multiple AC generators is finely aligned to rotor phase position.

12. The electrical power distribution system according to claim 11, wherein said multiple AC generators are finely aligned to said rotor phase position using pairs of flanges, which are connected using a slotted bolt arrangement that allows angular adjustment.

13. The electrical power distribution system according to claim 12, wherein at least one flange from said pairs of flanges is connected to said gearbox.

14. The electrical power distribution system according to claim 9, where said multiple AC generators are variable frequency generators.

15. The electrical power distribution system according to claim 10, where said multiple AC generators are variable frequency generators.

16. The electrical power distribution system according to claim 9, wherein said multiple AC generators send generated power to said electrical power distribution bus.

* * * * *